July 9, 1968     H. LINDEBOOM     3,391,965
FLUID RADIAL AND THRUST BEARING
Filed Sept. 6, 1967     3 Sheets-Sheet 1
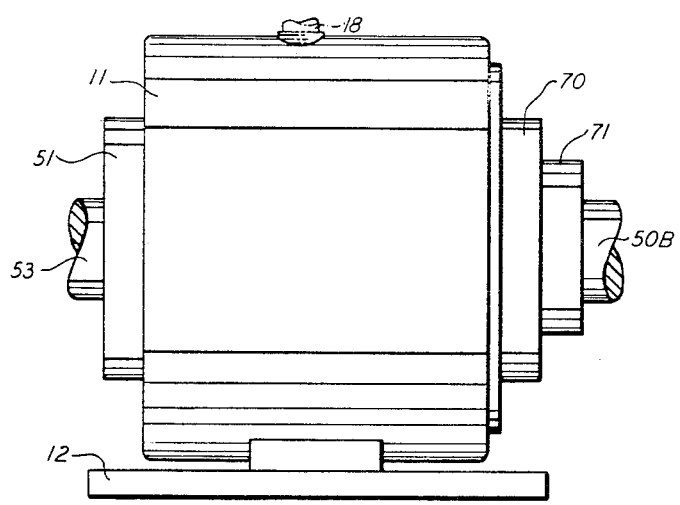
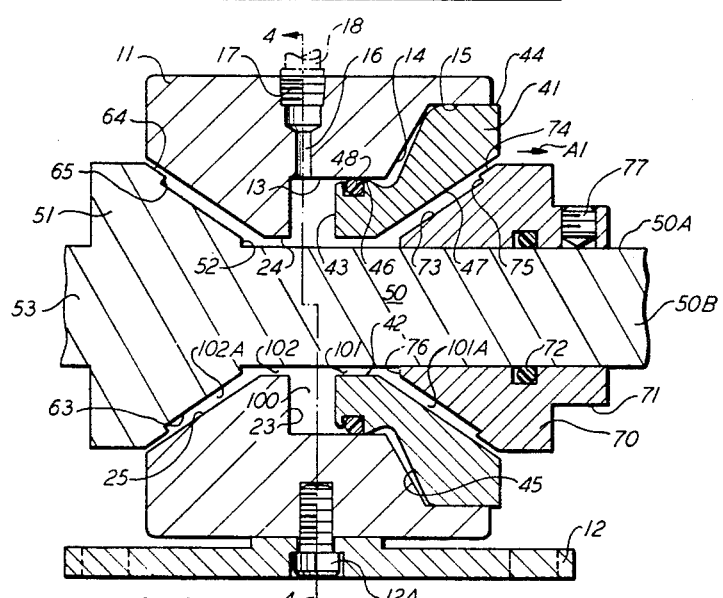
INVENTOR.
HERMAN LINDEBOOM
BY
*William Frederick Werner*
ATTORNEY INVENTOR.
HERMAN LINDEBOOM
BY
William Frederick Werner
ATTORNEY July 9, 1968     H. LINDEBOOM     3,391,965

FLUID RADIAL AND THRUST BEARING

Filed Sept. 6, 1967     3 Sheets-Sheet 3

INVENTOR.
HERMAN LINDEBOOM
BY William Frederick Werner
ATTORNEY

United States Patent Office 3,391,965
Patented July 9, 1968

---

3,391,965
FLUID RADIAL AND THRUST BEARING
Herman Lindeboom, North Kingston, R.I., assignor to Sealol, Inc., Warwick, R.I., a corporation of Delaware
Continuation-in-part of application Ser. No. 468,894 July 1, 1965. This application Sept. 6, 1967, Ser. No. 665,852
4 Claims. (Cl. 308—9)

ABSTRACT OF THE DISCLOSURE

Combination radial and thrust bearing, fluid supported and radially and axially self adjusting.

---

This application is a continuation-in-part of United States patent application Ser. No. 468,894 filed July 1, 1965.

This invention relates to fluid supported bearings and more particularly to fluid radial and thrust bearings.

An object of the present invention is to provide a self adjusting fluid radial and thrust bearing which centers a shaft within the bearing.

Another object of the present invention is to retain a shaft in floating position in relation to a housing and within tolerance limits of ten thousandths of an inch between the shaft and housing.

The present invention is an improvement over an article appearing in the Dec. 8, 1958 issue of Product Engineering by Clarence R. Adams and the following United States Patents: #2,961,277 dated Nov. 22, 1960 for Functional Bearings by Sternlicht; #3,101,224 dated Aug. 20, 1963 for High Load Hydrostatic Bearings by Adams; #3,112,140 dated Nov. 26, 1963 for Fluid Bearings by Adams.

Another object of the present invention is to provide an externally pressurized fluid bearing which is so constructed as to be adjustable in a manner to vary the fluid passageways.

Other objects of the present invention will be pointed out in part and become apparent in part in the following specification and claims.

Similar characters of reference refer to like parts in the following drawings, in which:

FIGURE 1 is a side elevational view of the new and improved fluid radial and thrust bearing.

FIGURE 2 is a vertical medial sectional view taken through FIGURE 1.

FIGURE 3 is a view similar to FIGURE 2 and is provided so as to distribute the reference characters upon two views instead of upon a single view.

Figure 4:
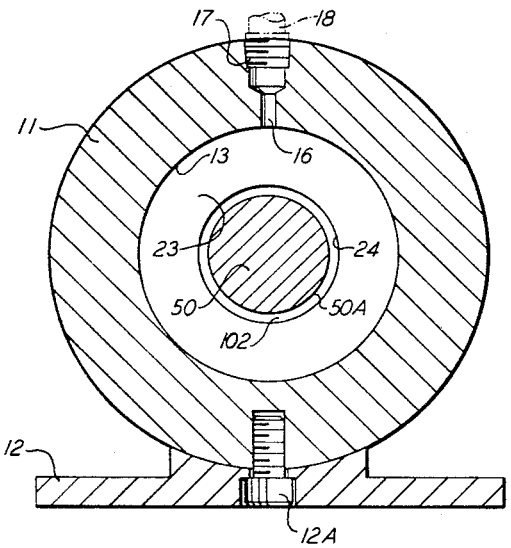
FIGURE 4 is a transverse vertical cross sectional view taken on line 4—4 of FIGURE 2.
Figure 6:
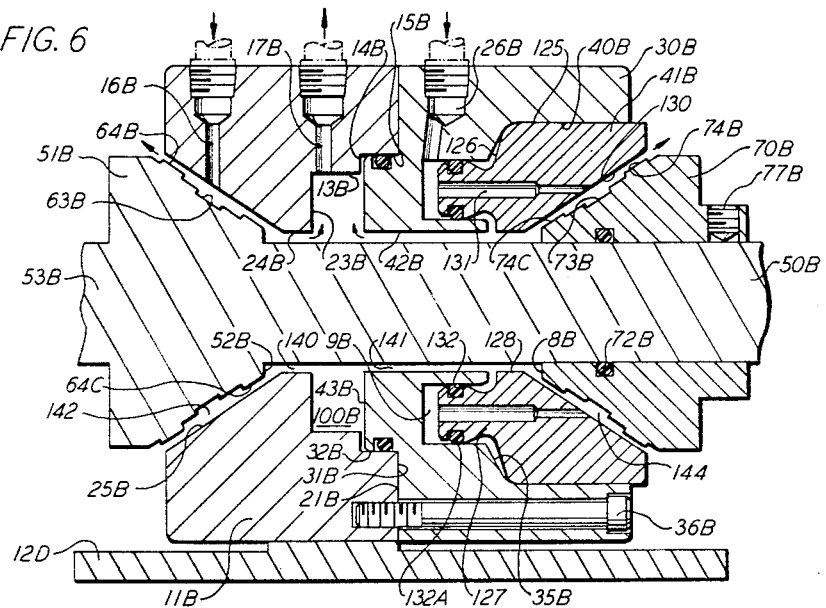

FIGURE 6 is a view similar to FIGURE 2 illustrating still another modified form of fluid radial and thrust bearing. Referring to FIGURES 1, 2, 3 and 4, there is illustrated a housing 11 to which a base 12 may be attached, as by means of a screw 12A. Housing 11 is provided with a coned shaped bearing surface 25, a shaft bore 24, a chamber wall 23, an axial bore 13, a relief wall 14 and a sealing ring wall 15. An inlet port 16 may be provided with a threaded area 17 to which an air or other fluid conduct 18 may be secured.

A sealing ring 41 is provided with a shaft bore 42, a second chamber wall 43, a housing engaging surface 44, a relief wall 45, a packing wall 46, and a second cone shaped bearing surface 47. A circular recess having a packing 48 is provided in packing wall 46 with packing 48 engaging axial bore 34 in fluid tight relationship.

A shaft 50 is provided with an enlarged head 51 shaped to provide a conical bearing surface 63 having a step 64, a circular ridge 65, a shoulder 52 and a shaft extension 53.

A mating disc 70 is slidably mounted upon outside surface 50A of shaft 50 and is provided with a collar 71, a circular recess having a packing 72 and a cone shaped bearing surface 73 provided with a circular step 74 having a circular ridge 75, a shoulder 76 and a set screw 77. Set screw 77 fastens mating disc 70 in selected position on shaft 50.

In FIGURE 2, the component parts just described are assembled as illustrated.

Shaft 50 is circular in cross section. Housing 11 provides a bearing 24 circular in cross section and larger in diameter than shaft 50 to provide an unrestricted passageway 102. (See FIGURE 3) Cone shaped bearing surface 63 and circular step 64 in cooperation with cone shaped bearing surface 25 provides a fluid passageway 102A unrestricted to circular ridge 65 and restricted by means of step 64.

Sealing ring 41 slidably attached to housing 11 provides a second bearing 42 for shaft 50. Bearing 42 is circular in cross section and larger in diameter than shaft 50 to provide an unrestricted passageway 101. Cone shaped bearing surface 47 is provided on sealing ring 41 as one wall of a circular fluid passageway 101A. Mating disc 70 with cone shaped bearing surface 73 and circular step 74 in cooperation with cone shaped bearing surface 47 provides a fluid passageway 101A unrestricted to circular ridge 75 and restricted by means of step 74. A pressure chamber 100 is formed between housing 11 and sealing ring 41 with an entrance port 16 and exit ports provided by passageways 101, 101A and 102 and 102A.

The entrance port 16 is of sufficient cross section and the pressure chamber 100 is of sufficient size so that there is very little pressure drop as fluid passes through the exit ports and between the stepped portions of passageways 101A and 102A.

Shaft 50 is a member movable relative to bearing surfaces 24, 42 in both a radial direction and an axial direction. Bearing surfaces 24, 42 are in a closely spaced relationship to outside surface 50A of shaft 50 so that the contour of bearing surfaces 24, 42 follow closely the contour of surface 50A. Surfaces 63, 73 are bearing surfaces fluid supported, respectively, in cone shaped bearing surfaces 25 and 47.

The steps 64, 74 occur near the outer parts of auxiliary bearing surfaces 63, 73 furthest away from pressure chamber 100, so that as the fluid flows from the chamber 100 and through the passageways 101, 101A, and 102, 102A, the fluid will pass over the steps 64, 74 at the end of the journey. In this manner shaft 50 is fluid supported in bearings 24, 42 for radial support and alignment and is supported in auxiliary bearings 63, 73 for radial support and axial alignment. The auxiliary bearings 63, 73 also provide radial alignment. Steps 64 and 74 in connection with the, respective, cone shaped bearing surface 25 and second coned shaped bearing surface 47 provide differential pressure generating means in the respective, fluid passageways 102A and 101A.

In operation fluid under pressure will enter chamber 100 through port 16. The fluid under pressure will pass into unrestricted passageways 101 and 102 where the fluid pressure will act upon the areas of the various surfaces. Area A is equal to the total area of second chamber wall 43. The fluid pressure acting upon area A will tend to move sealing ring 41 in the direction of arrow A1. Area B is equal to the area of cone shaped surface 73. Projected area B is equal to area A. Area C is equal to the area of circular step 74 and is one quarter the area of area B. Area D is equal to the area of second cone shaped surface 47 which is equal in area to the sum of areas B and C. Area G is equal in area to area D. Area F is equal in area to area C. Area E is equal in area to area B. Area H is equal in area to area A.

Suitable operation can be obtained if the steps 64, 74, dimensions F and C, respectively, comprise, one-fifth of the bearing surface of the sum of B added to C, and with the shaft 50 centered the distance between outside surface 50A and bearing surfaces 24, 42 and the width of passageways 101A and 102A is twice as large as the distance between steps 64, 74 and cone shaped surfaces 25, 47, respectively. When air is used as a fluid, it has been suitable that passageways 101, 101A and 102, 102A be about .0006 inch thick, except that under the steps 64, 74 the passageways 102A, 101A, should narrow to about .0003 inch. Also the length of passageways 101, 101A, 102, 102A added together should be not less than one half the diameter of the shaft 50.

The particular dimensions disclosed herein are appropriate for air as a fluid. But because of the nature of the operation of this air bearing any fluid could be used, whether liquid or gas, and still not depart from the spirit of this invention, even though somewhat different dimensions might be used, depending upon the nature of the fluid used and the initial size of fluid passageways 101, 101A, 102, 102A. The length to diameter ratio might be increased if the fluid passageways are widened.

For purposes of illustration, it may be assumed that end 50B of shaft 50 is attached to an electric motor (not shown) and that end 53 is attached to a grinding wheel (not shown). At the start of a given operation, outside surface 50A will be resting on a portion of bearing surfaces 24, 42 and a portion of steps 64, 74 will be resting upon coned shaped surfaces 25, 47, respectively. Thus, outside surfaces 50A will substantially block off the flow of fluid along the underside of shaft 50. But there will be considerable fluid flow over the top of the shaft 50, because of the larger openings between the steps 64, 74 and the respective, cone shaped surfaces 25, 47, on the upper side of the shaft 50.

The fluid leaves the pressure chamber 100 and enters passageways 101, 102 at substantially the same pressure around the entire perimeter of the entrances to passageways 101, 102 which entrance is at the juncture of pressure chamber 100. There is a reduction of pressure along the upper side of the shaft 50 for two reasons. First, because of the well-known physical principle that when the flow of a fluid is increased in velocity, the static pressure along the sides of the passageway through which the fluid flows decreases. Second, when a fluid flows, there is a force of friction which resists the flow of fluid as it proceeds through the passageways 101, 101A, 102, 102A which force of friction increases with an increase in the velocity of the fluid. Because of this force of friction, the static pressure drops as the fluid proceeds in its flow through the passageways 101, 101A, 102, 102A. However, on the lower side of the shaft, the passageways are substantially blocked off. Therefore, the fluid proceeds through the passageways along the lower side of the shaft at a very low velocity. As the fluid proceeds along the passageways there is little drop in static pressure in the passageways along the bottom of the shaft for two reasons:

First, considering the physical principle that when the flow of a fluid is increased in velocity, the static pressure along the sides of the passageways through which the fluid flow decreases; since there is so little flow of fluid along the bottom of the shaft 50 this physical phenomenon causes only a small reduction in fluid pressure along the bottom of the shaft 50.

Second, the velocity of flow is so small that little friction is created as the fluid flows along the bottom side of the passageways. Because of this lack of frictional force, there is little drop in pressure as the fluid proceeds through the passageways along the lower portion of the shaft 50. Therefore, along the bottom of the passageways, there is little pressure drop from the pressure chamber 100 to the point in the passageways where the steps 64, 74 begin. This causes a build-up of pressure along the lower side of the shaft 50, and there is an unbalance of forces tending to push the shaft 50 off the steps 64, 74. This unbalance of forces tends to center the shaft in the bearing surfaces. When a load is imposed on the shaft 50 which acts perpendicular to the axis of the shaft 50, the shaft gets closer to the steps 64, 74 and tends to cut down the flow of fluid in the passageways near where the steps 64, 74 are closest to cone shaped surfaces 25, 47, respectively. Therefore, there will be a build-up of pressure in the passageways 101A, 102A where the flow of fluid is substantially impeded by the steps 64, 74, which is the case when the steps 64, 74 come close to cone shaped surfaces 25, 47, respectively. Where there is this build-up of pressure, there will be the unbalance of forces tending to force the shaft 50 and steps 64, 74 away from cone shaped surfaces 25, 47. In this manner, the shaft 50, enlarged head 51, and mating disc 70 are continually centered in the respective bearing surfaces.

Sealing ring 41 is provided so that it may shift axially in relation to mating disc 70 so as to assure a clearance of .0003 inch between step 74 and cone shaped surface 47 and with the axial shifting of shaft 50, to assure a clearance of .0003 inch between step 64 and cone shaped surface 25.

Imperfections in the surfaces of steps 74, 64 will prevent air lock between said steps and cone shaped surfaces 47, 25, respectively, because even when engagement occurs, air will pass between the engaging surfaces.

Figure 5:
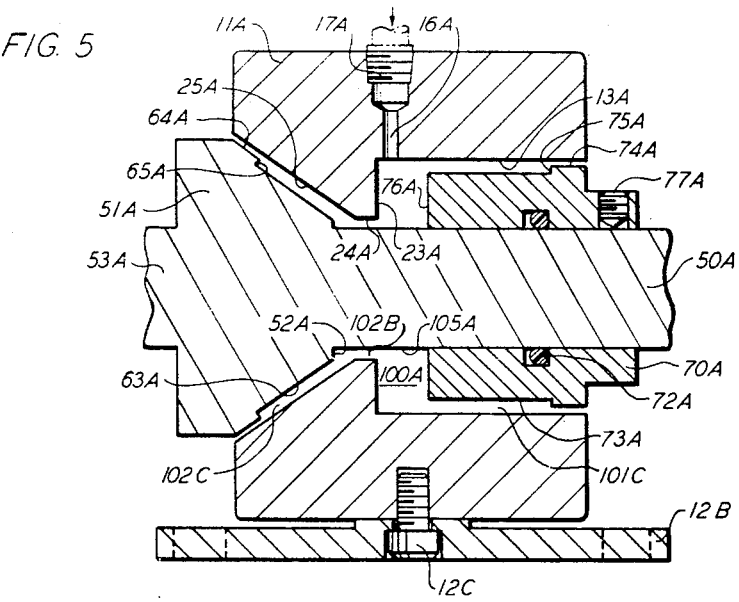
FIGURE 5 is a view similar to FIGURE 2 illustrating a modified form of a fluid radial and thrust bearing.

With reference to FIGURE 5, wherein is illustrated a modified form of fluid radial and thrust bearing, it will be noted that housing 11A and shaft 50A are identically constructed with the showing of housing 11 and shaft 50 in FIGURES 2 and 3.

Housing 11A is provided with a cone shaped bearing surface 25A, a shaft bore 24A, a chamber wall 23A, an axial bore 13A. Chamber wall 23A and axial bore 13A form a chamber 100A. An inlet port 16A may be provided with a threaded area 17A to which an air or other fluid conduit (not shown) may be secured. Port 16A is a conduit to chamber 100A. A base 12B may be attached to housing 11A by means of screws 12C.

Shaft 50A is provided with an enlarged head 51A shaped to provide a conical bearing surface 63A having a step 64A, a circular ridge 65A, a shoulder 52A and a shaft extension 53A.

A mating disc 70A adjustably mounted upon shaft 50A is provided with a set screw 77A for fastening in selected position. Mating disc 70A is also provided with a circular recess having a fluid tight packing 72A, a bearing surface 73A, a circular step 74A, a circular ridge 75A, and a shoulder 76A. Mating disc 70A is located in chamber 100A.

In FIGURE 5 the component parts are assembled as illustrated. Shaft 50A is circular in cross section. Housing 11A provides a bearing 24A circular in cross section and larger in diameter than shaft 50 to provide an unrestricted passageway 102B. Cone shaped bearing surface 63A and circular step 64A in cooperation with cone shaped bearing surface 25A provides a fluid passageway 102C unrestricted to circular ridge 65A and restricted by means of step 64A. Mating disc 70A with bearing surface 73A and circular step 74A in cooperation with axial bore 13A provides a fluid passageway 101C unrestricted to circular ridge 75A and restricted by means of step 74A. Packing 72A provides a fluid tight seal between shaft 50A and mating disc 70A. Passageways 101C and 102C provide an exit for the fluid entering chamber 100A through port 16A.

It becomes apparent that shaft 50A is provided with three bearing surfaces, namely, cone shaped bearing surface 63A, stepped at 64A, bearing surface 73A and that area along the outside surface of shaft 50A between shoulder 52A and shoulder 76A, indicated at 105A. Shaft 50A is movable relative to shaft bore 24A, axial bore 13A and cone shaped bearing surface 25A and is fluid supported by means of the respective, cooperating bearing surfaces 105A, 73A, 63A.

The steps 74A, 64A occur near the outer parts of axial bore 13A and cone shaped bearing surface 63A, furthest away from pressure chamber 100A, so that, as the fluid flows from chamber 100A and through the pasageways 101C, 102C, the fluid will pass over the steps 74A, 64A at the end of the journey and to atmosphere. In this manner shaft 50A is fluid supported in bearings 24A and 13A for radial support and alignment and is supported in cone shaped bearing surface 25A for radial support and in cooperation with chamber wall 23A for axial alignment.

With reference to FIGURE 6, wherein is illustrated another modified form of fluid radial and thrust bearing, there is provided a housing 11B having a cone shaped bearing surface 25B, a shaft bore 24B, a chamber wall 23B, an axial bore 13B, an end wall 14B, a step wall 15B, a housing adapter wall 31B, an inlet port 16B and an outlet port 17B.

A first housing adapter 30B provided with a housing surface 21B, a step engaging wall 32B, a chamber wall 43B, a shaft bore 42B, a circular recess 9B, a relief wall 35B and a piston wall 40B, is fastened to housing 11B with housing surface 21B abutting housing adapter wall 31B and with step engaging wall 32B abutting step wall 15B. Fastening means such as screws 36B may be used to fasten first housing adapter 30B to housing 11B to thereby provide a type of unitary housing structure. An inlet port 26B is provided in first housing adapter 30B. A base 12D may be fastened to housing 11B, as by welding.

A shaft 50B is provided with an enlarged head 51B shaped to provide a conical bearing surface 63B having a plurality of steps 64B, 64C, a shoulder 52 and a shaft extension 53B.

A mating disc 70B adjustably mounted upon shaft 50B is provided with a set screw 77B for fastening in selected position. A fluid tight packing 72B is located between mating disc 70B and shaft 50B. Mating disc 70B is also provided with a cone shaped bearing surface 73B having steps 74B and 74C and a shoulder 8B.

A piston 41B is provided with a sliding surface 125, a relief surface 126, a circular collar 127, an axial bore 128, and a cone shaped bearing surface 130. Piston 41B is slidingly mounted in first housing adapter 30B with sliding surface 125 slidingly engaging piston wall 40B and with circular collar 127 slidingly engaging circular recess 9B. A fluid conduit 131 is located in piston 41B. Two circular grooves are provided in circular collar 127 and fluid tight packings 132, 132A are respectively, located in the two circular grooves.

In FIGURE 6 the component parts are assembled as illustrated. Shaft 50B is circular in cross section. Housing 11B provides a bearing 24B and first housing adapter 30B provides a bearing 42B, both bearings are circular in cross section and larger in diameter than shaft 50B to provide two unrestricted passageways 140, 141 in communication with a chamber 100B and outlet port 17B. Cone shaped bearing surface 63B and steps 64B and 64C in cooperation with cone shaped bearing surface 25B provides a fluid passageway 142 restricted by steps 64B and 64C. Inlet port 16B is in communication with passageway 142.

Piston 41B slidably attached to first housing adapter 30B provides another bearing surface 128 for shaft 50B and thereby a continuation of unrestricted passageway 141. Cone shaped bearing surface 130 in cooperation with cone shaped bearing surface 73B provides a passageway 144 restricted by steps 74B and 74C. Fluid passes through inlet port 26B to circular recess 9B and through fluid conduit 131 to passageway 144 where the fluid passes in opposite directions simultaneously passed step 74B to the atmosphere and passed step 74C to passageway 141, chamber 100B to outlet port 17B.

Having shown and described preferred embodiments of the present invention by way of example, it should be realized that structural changes could be made and other examples given without departing from either the spirit or scope of this invention.

What I claim is:
1. A pressurized fluid bearing for supporting both radial and thrust loads comprising a housing having a cone shaped bearing surface, a shaft bore, a chamber wall substantially perpendicular to said shaft bore, an axial bore substantially parallel to said shaft bore, a shaft having an enlarged head provided with a conical bearing surface substantially parallel with said cone shaped bearing surface and forming a first passageway therebetween, means in said first passageway restricting the passage of fluid therethrough, a mating disc provided with a bearing surface substantially parallel to said axial bore, and a shoulder substantially perpendicular to said bearing surface, said shoulder and said chamber wall forming a fluid pressure chamber therebetween, an inlet port in said housing in communication with said fluid pressure chamber, said mating disk bearing surface and said axial bore forming a second passageway therebetween, means in said second passageway restricting the passage of fluid therebetween, means adjustably securing said mating disc to said shaft and thereby increasing or decreasing the area of said fluid pressure chamber, fluid tight means between said mating disc and said shaft, said shaft bore and said shaft combining to form a third passageway therebetween, connecting said fluid pressure chamber with said first passageway, and second passageway in communication with said fluid pressure chamber, whereby said first passageway and said second passageway under the influence of fluid pressure from said fluid pressure chamber radially supporting said shaft, and said shoulder under the influence of fluid pressure in said fluid pressure chamber axially adjusting said shaft to thrust loads.

2. A pressurized fluid bearing in accordance with claim 1 in which said means in said first passageway restricting the passageway of fluid therethrough constitutes a first circular ridge forming a first step on said cone shaped bearing surface, and said means in said second passageway restricting the passage of fluid therebetween constitutes a second circular ridge forming a second step on said bearing surface of the mating disc.

3. A pressurized fluid bearing in accordance with claim 2 in which said first passageway constitutes a thickness between 0.006 inch and 0.00065 inch, and said first having a thickness of approximately 0.003 inch, thereby restricting said first passageway to a thickness of between 0.0003 inch and 0.00035 inch, at said first circular ridge, and in which said second passageway constitutes a thickness between 0.006 inch and 0.00065 inch, and said second step having a thickness of approximately 0.0003 inch, thereby restricting said second passageway to a thickness of between 0.003 inch and 0.00035 inch.

4. The combination according to claim 1, wherein, said chamber being of sufficient size to prevent any substantial pressure drop in said chamber as fluid passes from said cavity area to said third passageway, said first passageway and to said second passageway.

No references cited.

MARTIN P. SCHWADRON, *Primary Examiner.*

FRANK SUSKO, *Examiner.*